US007181413B2

(12) United States Patent
Hadden et al.

(10) Patent No.: US 7,181,413 B2
(45) Date of Patent: Feb. 20, 2007

(54) PERFORMANCE-BASED TRAINING ASSESSMENT (75) Inventors: David D. Hadden, Hillsborough, NC (US); Jonathan Estes, Hillsborough, NC (US); Glenn Peirce, Durham, NC (US); Mark Clark, Durham, NC (US); Robert A. Gibson, Cary, NC (US)

(73) Assignee: Capital Analytics, Inc., Durham, NC (US)

( * ) Notice: Subject to any disclaimer, the term of this patent is extended or adjusted under 35 U.S.C. 154(b) by 0 days.

(21) Appl. No.: 09/837,076

(22) Filed: Apr. 18, 2001

(65) Prior Publication Data
US 2003/0187723 A1 Oct. 2, 2003

(51) Int. Cl.
*G06F 11/34* (2006.01)

(52) U.S. Cl. ........................................ 705/11; 434/107

(58) Field of Classification Search ................ 705/11; 434/107
See application file for complete search history.

(56) References Cited

U.S. PATENT DOCUMENTS

| 4,571,682 | A | * | 2/1986 | Silverman et al. ........... 600/301 |
| 5,416,694 | A |   | 5/1995 | Parrish et al. ............... 364/401 |
| 5,435,320 | A |   | 7/1995 | Seitz ........................... 600/595 |
| 5,545,044 | A |   | 8/1996 | Collins et al. ............... 434/322 |
| 5,577,919 | A | * | 11/1996 | Collins et al. ............... 434/322 |
| 5,788,504 | A |   | 8/1998 | Rice et al. ................... 434/219 |
| 5,813,945 | A |   | 9/1998 | Bernacki ....................... 482/5 |
| 5,830,158 | A |   | 11/1998 | Zanakis ....................... 600/595 |
| 5,868,578 | A |   | 2/1999 | Baum .......................... 434/247 |
| 5,879,165 | A |   | 3/1999 | Brunkow et al. ............ 434/322 |
| 5,947,747 | A |   | 9/1999 | Walker et al. ............... 434/354 |
| 5,963,931 | A |   | 10/1999 | Fagg, III et al. .............. 706/50 |
| 5,980,429 | A | * | 11/1999 | Nashner .......................... 482/8 |
| 6,018,732 | A |   | 1/2000 | Bertrand et al. .............. 706/60 |
| 6,032,141 | A |   | 2/2000 | O'Connor et al. ............ 706/45 |
| 6,073,127 | A |   | 6/2000 | Lannert et al. ............... 706/45 |
| 6,081,786 | A |   | 6/2000 | Barry et al. ................... 705/3 |
| 6,116,652 | A |   | 9/2000 | Page ............................ 283/45 |
| 6,119,097 | A |   | 9/2000 | Ibarra ........................... 705/11 |
| 6,125,358 | A |   | 9/2000 | Hubbell et al. ............... 706/11 |
| 6,128,608 | A |   | 10/2000 | Barnhill ........................ 706/16 |
| 6,134,539 | A |   | 10/2000 | O'Connor et al. ............ 706/45 |
| 6,157,808 | A | * | 12/2000 | Hollingsworth ............. 434/350 |
| 6,190,287 | B1 | * | 2/2001 | Nashner .......................... 482/8 |
| 6,275,812 | B1 | * | 8/2001 | Haq et al. ..................... 705/11 |

(Continued)

FOREIGN PATENT DOCUMENTS

JP 02072483 A * 3/1990

OTHER PUBLICATIONS

"Knowledge Products Division Supports Company-wide Roll-out" Jan. 92, 2001 [retrieved from Internet].*

(Continued)

*Primary Examiner*—Catherine M. Tarae
(74) *Attorney, Agent, or Firm*—MacCord Mason PLLC (57) ABSTRACT The present invention analyzes the impact of known or unknown events on the fulfillment of business goals. In light of a defined business strategy, a performance outcome related to the business goal is analyzed to determine the effect of an event on the business goal. For training evaluation, the actual impact of training given for particular skills on job and business performance is readily determined.

4 Claims, 5 Drawing Sheets

U.S. PATENT DOCUMENTS

| | | | |
|---|---|---|---|
| 6,289,340 B1 * | 9/2001 | Puram et al. | 707/5 |
| 6,341,267 B1 * | 1/2002 | Taub | 705/11 |
| 6,459,787 B2 * | 10/2002 | McIllwaine et al. | 379/265.06 |
| 6,589,055 B2 * | 7/2003 | Osborne et al. | 434/219 |
| 6,606,480 B1 * | 8/2003 | L'Allier et al. | 434/362 |
| 6,632,158 B1 * | 10/2003 | Nashner | 482/8 |
| 6,944,596 B1 * | 9/2005 | Gray et al. | 705/1 |
| 2001/0039508 A1 * | 11/2001 | Nagler et al. | 705/11 |

OTHER PUBLICATIONS

"Global Knowledge Fixes Training Costs, Guarantees Learning Results for Italian Credit Management Firm," PR Newswire, Mar. 16, 1998 [retrieved from Proquest].*

"Global Knowledge Network to Provide Deutsche Telekom Customers and Employees with Competency-based SAP Training," PR Newswire, Nov. 24, 1998 [retrieved from Proquest].*

"Cellular Phone Company Selects IT Educator's Competus Framework Design and Deliver Comprehensive Training Program on Office Applications," PR Newswire, 1999 [retrieved from Proquest].*

L, Marcia. "Use your head when identifying skills gaps," Workforce, Mar. 2000 [retrieved from Dialog].*

Muhlemeyer, Peter et al. "The competitive factor: training and development as a strategic management task," Journal of Workplace Learning, 1997 [retrieved from Dialog].*

Campbell, Clifton P. "Determining the cost-effectiveness of training," Training & Management Development Methods, 1997 [retrieved from Dialog].*

Bedinham, Keith.. "Proving the effectiveness of training," Human Resource Management International Digest, Jan./Feb. 1998 [retrieved from Dialog].*

* cited by examiner

*FIG. 1A*

| ROLE<br>(JOB) | INDIVIDUAL<br>(EMPLOYEE) |
|---|---|
| • REQUIRED SKILL W/ SKILL LEVEL<br>• DEFINED PERFORMANCE<br>• DESIRED PERFORMANCE METRIC | • POSSESSED SKILL W/ SKILL LEVEL<br>• KNOWN PERFORMANCE<br>• REALIZED PERFORMANCE METRIC |

PERFORMANCE-BASED TRAINING ASSESSMENT

FIELD OF THE INVENTION

The present invention relates to assessing the benefit of training, and in particular, assessing the effects of training based on actual job performance.

BACKGROUND OF THE INVENTION

One key to successfully operating a business is the effectiveness of the training delivered to employees. The character and quality of the instructors are critical elements of that effectiveness. Also crucial is supporting management and instructors with tools that enable delivery of consistent, high-quality, job-related instruction and support. Equally critical is providing management and instructors with a method of assessing the effectiveness of the delivery of such job-related instruction.

Existing systems and methods for workforce planning and occupational readjustment have traditionally relied on manual analysis of an individual's skills, with little or no emphasis on job-related analysis or needs analysis of the employer. Additionally, the current state of the art fails to link training resources and employer goals as part of an overall approach.

Although formal training programs and systems, job experience, and an understanding of procedural requirements can help an employee, there is little systemic help available to provide an assurance to an employer that the employee possesses the necessary knowledge and skills to perform the particular tasks or duties associated with the job in which the employee is operating. Where such employee skills-assessment systems are in place, there is little assessment of the direct impacts of knowledge or skills on job performance, overall employee performance, employer goals and objectives, or the company bottom line.

Current state-of-the-art training assessment is directed toward assessing the employee retention of trained knowledge and skills, with no measure of the effectiveness of the training itself. Such systems do not assess the effect of any subsequent transfer of knowledge or skills on the job-specific performance of the employee. Further, such systems do not assess the impact of any changes in performance on the employer-specific goals. Lastly, such impacts remain unassessed in relation to direct and indirect bottom line return on investment (ROI) in occupational readjustment. As such, there is a need for an effective way to quantify the impact of training and other events, on actual job performance instead of merely testing to see whether select knowledge or skills, which may have no impact on performance, are improved by the training.

SUMMARY OF THE INVENTION

The present invention analyzes the impact of known and unknown events on the fulfillment of business goals. In light of a defined business strategy, a performance outcome related to the business goal is analyzed to determine the effect of an event on the business goal. For training evaluation, the actual impact of training given for particular skills on job and business performance is readily determined.

Preferably, Roles are defined that are believed necessary to fulfill a desired business outcome. Each Role will preferably include a name and a brief description of the Role. The required skill or skills for the Role are associated with the Role. The skills are preferably associated with a skill level, which preferably includes a value within a defined range associated with varying proficiencies for performing the skill. A defined performance is associated with each Role. A desired performance metric, which is a measure of actual performance, is then set for each performance.

Based on the skills and skill levels required for the Roles, employees with compatible skills and skill levels are assigned to the Roles. Once the employees are working within assigned Roles, performance metrics are taken to quantify how well the employee is carrying out a performance within the defined Role. The performance metrics may be quantified at any time, and preferably before and after a given event occurrence, such as a training event.

Preferably, for any given Role or groups thereof, gaps between skill levels required by the Role and possessed by the employee are identified. The gaps in skill levels between the Roles and employees may be used to identify the need for training. Similarly, gaps between performance metrics required by the Role and accomplished by the individual may be detected and analyzed. These gaps highlight skills in which the employee is either underqualified or apparently overqualified for the role. The identified gaps are useful to identify training that may bring an employee's skill levels up to par with those required by the role.

After an event occurrence, such as training, the actual skill levels and/or performance metrics of the employees are reassessed. Preferably, a statistical analysis of the relationships between one or more skills, skill levels, performances, performance metrics, training, and the like for trained and/or untrained employees may be conducted to determine the effect of the event occurrence on job performance or on overall business strategies.

The types of analysis preferably include one or more of the following:

1. comparing skill levels for a particular employee before and after the occurrence of a given event, particularly training;
2. comparing a performance metric for a particular employee before and after the event occurrence;
3. comparing changes in skill levels and changes in performance metrics for an employee;
4. comparing changes in one performance metric to changes in one or more other performance metrics;
5. comparing any one or a combination of the above relationships among employees subjected to the event occurrence, such as all employees receiving training for a particular skill, and among those employees not subject to the event occurrence or training;
6. identifying influences beyond the event occurrence, or training, that affect the relationships, and in particular, affect performance metrics leading to the fulfillment of objectives, goals, or strategies.

Any of these relationships may be combined with one or more of the other relationships to help assess the relationships between skill levels, performance metrics, known events, and unknown influences.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention provides a powerful and effective technique for assessing the benefit of training, and optionally, the impact of events on job performance, business strategies, or corporate goals. A detailed description of the preferred embodiments is provided followed by several examples incorporating the concepts of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1A:
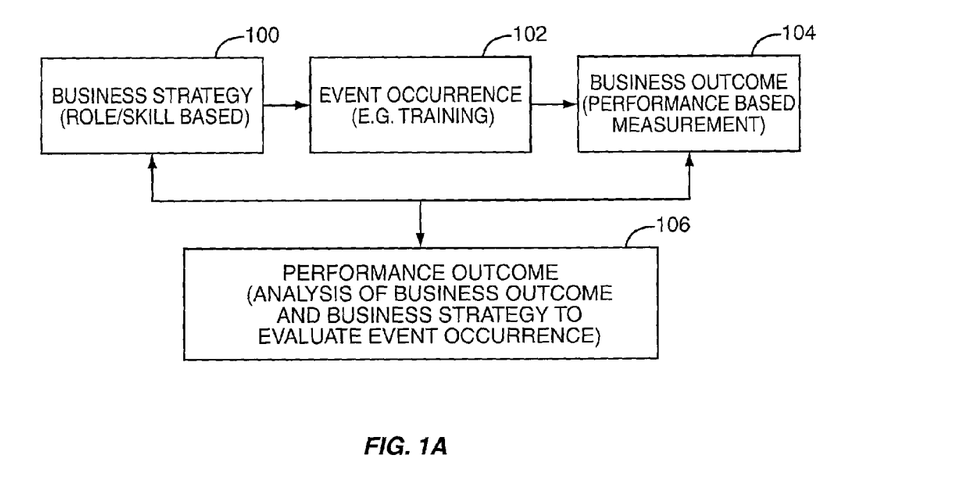
FIG. 1A is a block representation of the high-level flow of the present invention.

FIG. 1A illustrates the overall concept of the present invention. In essence, a business strategy (block 100) identifies Roles and the necessary skill required for each Role to fulfill the business strategy. An event occurrence (block 102), such as training to improve skills associated with the Role, is provided in association with carrying out the business strategy. A business outcome (block 104) bearing on the fulfillment of the business strategy is also defined. The business outcome is typically a performance-based measurement, such as net sales, gross income, or the number of widgets produced in a select period of time.

In light of the business strategy (block 100), the event occurrence (block 102), and the business outcome (block 104), a performance outcome (block 106) is determined by analyzing the effect of the event occurrence on the business outcome. For training evaluation, the present invention provides a unique way of determining the impact of training given for particular skills on job and business performance. The invention and its numerous benefits will become clearer in light of the following discussion.

Preferably, the invention facilitates implementing business strategies by defining Roles, or jobs, necessary to fulfill the business strategy. As outlined in FIG. 1B, each Role is preferably associated with a required skill, a defined performance, and a desired performance metric. The required skill is typically associated with a required proficiency, referred to herein as a skill level. For example, a skill may be typing, wherein a skill level will reflect words per minute reduced by a factor bearing on the number of errors. For the purpose of discussion, skill levels are normalized on a six-point scale (0 to 5).

Figure 1B:
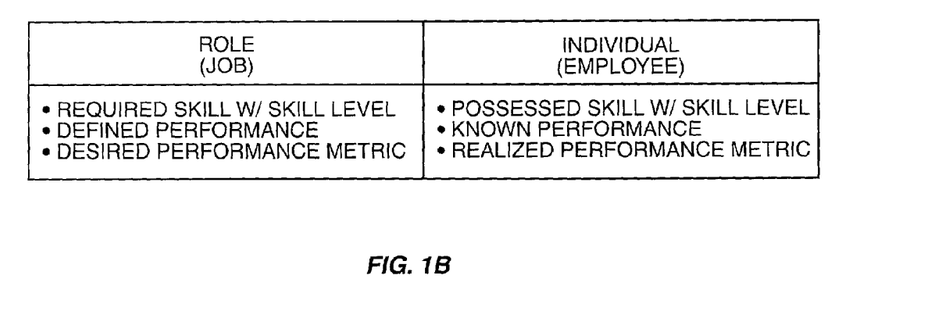
FIG. 1B is a table outlining primary elements and associated information according to a preferred embodiment of the present invention.

A performance refers to the unit of measurement for a particular task. For example, a performance may be a number of invoices processed per day. A performance metric is a measurement of a performance. For example, a performance metric for invoices per day may be 20 invoices per day. For the above examples, a Role may be defined as a Secretary. The secretary will require the skill of typing with an associated skill level of 50 words per minute, which corresponds to a three on the six-point scale. The defined performance for the Role of Secretary is measured in invoices per day. The desired performance metric for the Role may be 20 invoices per day. A particular employee should be assigned to fulfill the Role. Notably, the skill level and performance metric are requirements for the Role, not the actual abilities of the employee fulfilling the role.

Continuing with FIG. 1B, the particular resources to fulfill a Role are individuals, or employees. For clarity and consistency, the terms Roles and employees will be used throughout the disclosure. The skills and abilities of employees will be measured through any number of evaluation techniques to determine a possessed skill and an actual or realized performance metric for the known performance. The difference among skills, performances, and performance metrics associated with Roles and those associated with employees is that the values for Roles define prerequisites and for employees define actual abilities. As will be discussed in greater detail below, employees will be used to fulfill roles, which are created to fulfill business strategies, objectives, and goals. The present invention preferably assesses the relationship between skills and job performance to determine the relative impact of training to improve skills.

Figure 2A:
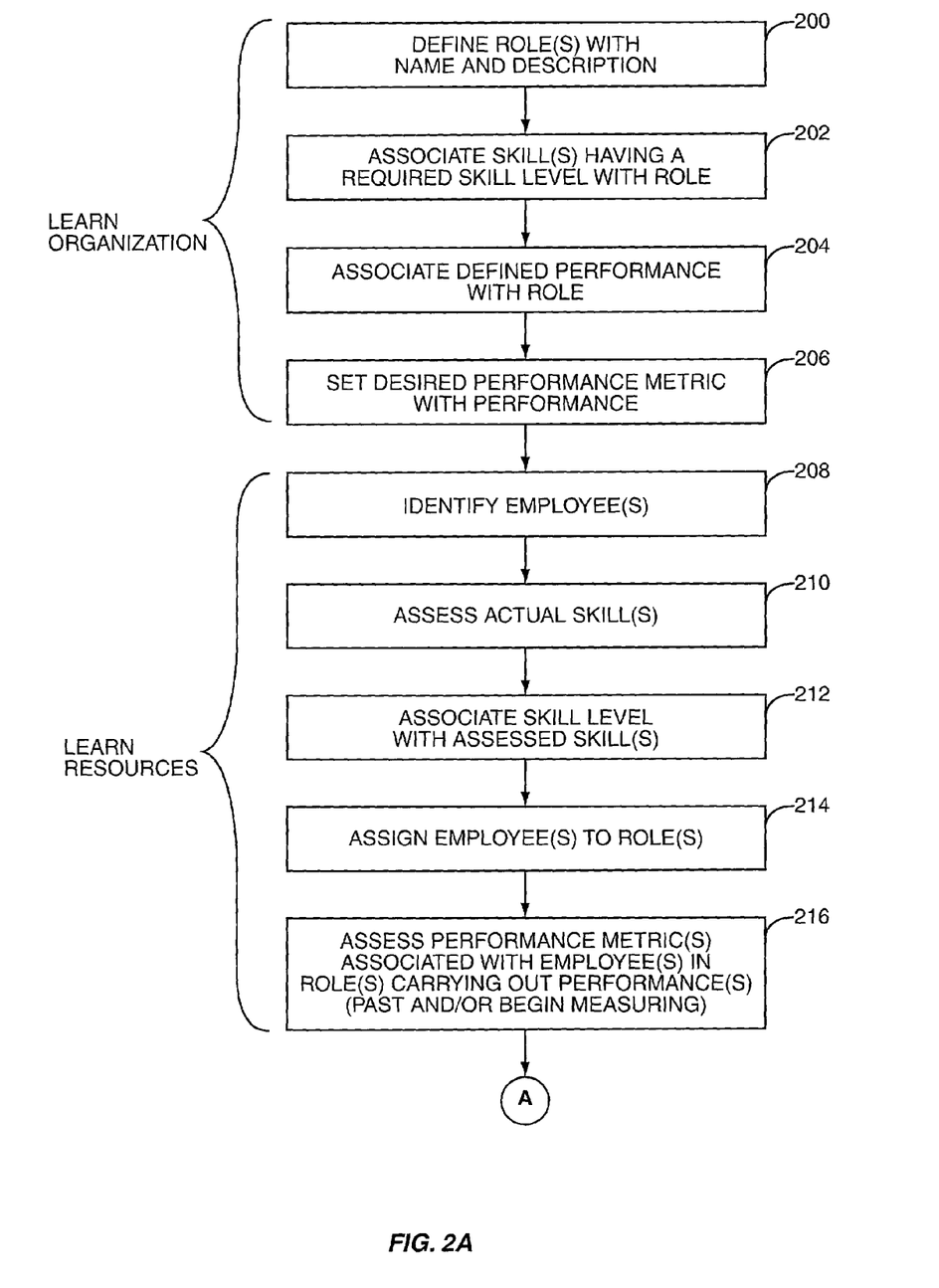
FIGS. 2A and 2B are a flow chart outlining a preferred process of carrying out the present invention.
Figure 2B:
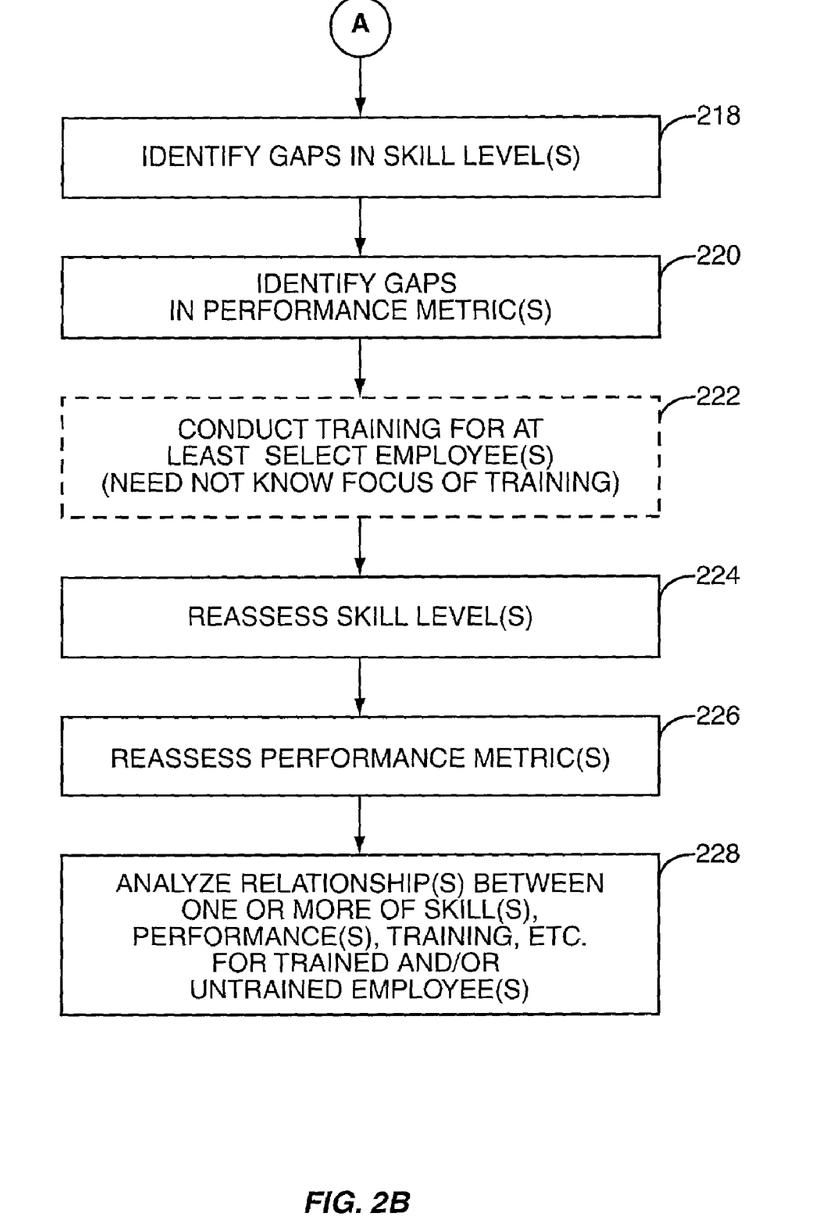

A detailed flow for carrying out the preferred embodiment of the present invention is provided in the flow chart of FIGS. 2A and 2B. Initially, it is preferred to learn the objectives, goals, or strategies of the organization. As such, Roles are defined that are believed necessary to fulfill a desired business outcome (step 200). Each Role will preferably include a name, such as "Secretary," and a brief description of the Role. The name and description are typically text field used for identification purposes. Next, the required skill or skills for the role are associated with the Role (step 202). As noted, the skills are associated with a skill level, which preferably includes a value within a defined range associated with varying proficiencies for performing the skill. Next, a defined performance is associated with each Role (step 204). A desired performance metric is then set for each performance (step 206). At this point, each Role is defined and associated with the required skill, defined performance, and desired performance metric, as outlined in FIG. 1B.

Next, the resources available to fulfill the Roles are learned. In particular, the employees are identified (step 208) and their actual skills are assessed (step 210). Preferably, the possessed skill of the individual and the required skill for the Role relate to one another. Next, the skill levels of the employees are determined, preferably using a scale corresponding to that associated with the Roles, and associated with the respective skills of the employees (step 212). Skill levels may be determined by testing, self-assessment, peer review, or the like. At this point, the employees are identified and their respective skills and the level of their skills have been assessed.

Based on the required skills for the Roles, employees with compatible skills and skill levels are assigned to the Roles (step 214). Once the employees are working within assigned Roles, performance metrics are taken to quantify how well the employee is carrying out a performance within the defined Role (step 216). The performance metrics may be taken at any time, and are preferably taken periodically on an ongoing basis. For an existing company with existing employees and Roles, the performance metrics may be available from past measurements. For a new Role, new employee, or new company, it may be necessary to begin measuring performance metrics periodically on an ongoing basis.

Preferably, for any given Role or groups thereof, gaps between skill levels required by the Role and possessed by the employee are identified (step 218). The gaps in skill levels between the Roles and employees may be used to identify the need for training, or as discussed in more detail below, the need to redefine the requirements for the Role. Similarly, gaps between performance metrics required by the Role and accomplished by the individual may be detected and analyzed, as discussed below (step 220). These gaps highlight skills in which the employee is under qualified or apparently over qualified for the Role. The identified gaps are very useful for identifying training to bring an employee's skill levels up to par with those required by the Role.

At this point, an event occurrence, preferably a training event pertaining to identified skills, is conducted for at least select employees (step 222). Notably, it is not necessary to know or understand the focus of the training for the present invention. In fact, one of the most beneficial characteristics of the invention is that a determination of the effectiveness of the training on a business outcome, such as an objective goal or strategy, is provided without the need for an understanding of the training or event occurrence.

After training or an event occurrence, the actual skill levels and performance metrics of the employees are reassessed (steps 224 and 226). At this point, the skill levels and performance metrics for the employees before and after the event occurrence are known. Based on this and virtually any other identified information, a statistical analysis of the relationships between one or more skills, skill levels, performances, performance metrics, training, and the like for trained and/or untrained employees is provided (step 228). Sample types of analysis are outlined in the flow chart of FIG. 3.

Figure 3:
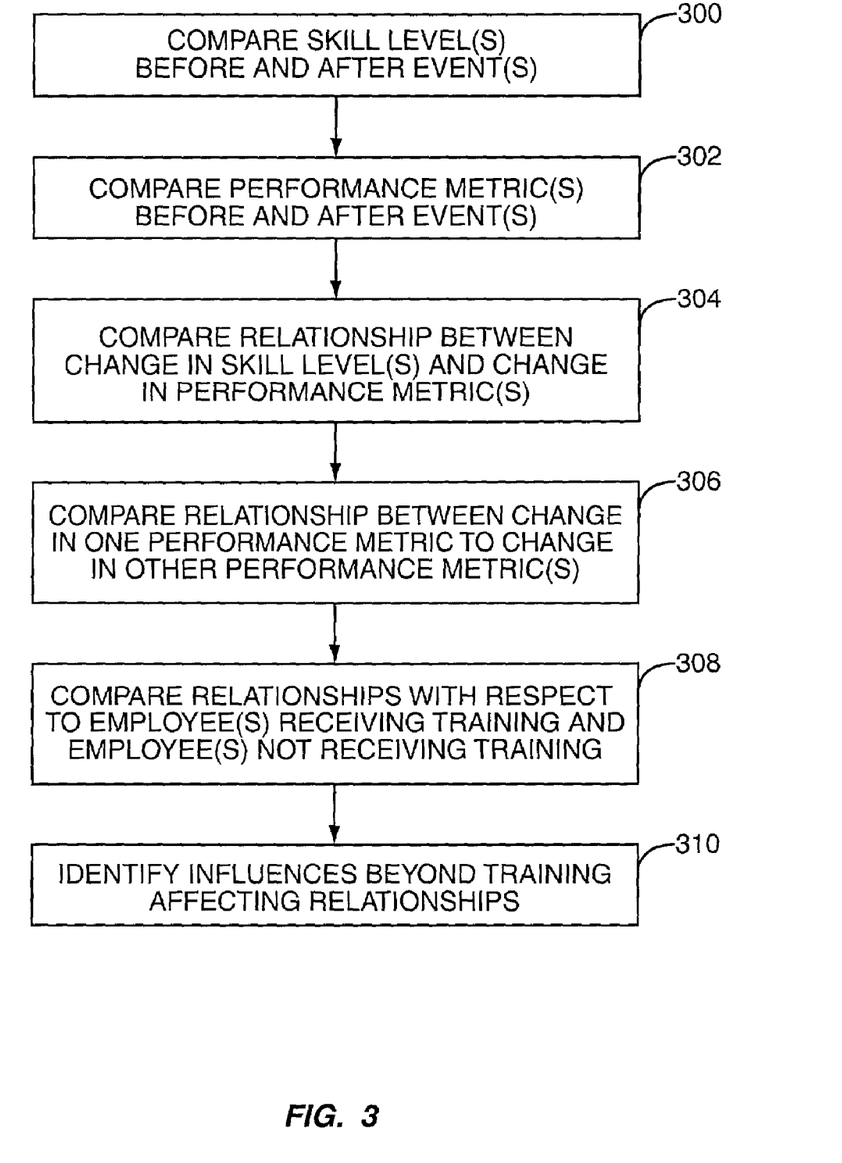
FIG. 3 is a flow chart outlining potential types of analysis performed according to a preferred embodiment of the present invention.

The analysis of the various relationships preferably begins by comparing skill levels for a particular employee before and after the occurrence of a given event, particularly training (step 300). The difference in quantified skill levels will show the impact of training on a particular employee's skill. Similarly, a performance metric for a particular employee may be compared before and after the event occurrence (step 302). This comparison is particularly useful in determining whether or not the training for a particular skill has an effect on job performance. Depending on the quantified improvement in performance, continued training or the amount of training for a particular Role may be decided.

A comparison may be made between changes in skill levels and changes in performance metrics for an employee (step 304). The relationship between skill levels and performance metrics may help determine whether a change in skill level corresponds to a change in performance. A correlation may be established to determine the amount of change in a skill level necessary to effect a defined change in a performance metric. If there is a significant change in a skill level and little or no change in a performance metric, this indicates that the defined and measured skill level has little effect on job performance. Such a result may also indicate that the defined skill, regardless of level, has little or no bearing on job performance. A significant change in a performance metric corresponding to little or no change in a skill level provides a strong indication that another influence had an impact on job performance, or that, again, the skill or skill level has minimal impact on job performance.

The relationship between a change in one performance metric to a change in one or more other performance metrics may also be analyzed (step 306). Such an analysis provides unique information on the effect of different aspects of job performance on one another. Notably, any of these relationships may be studied in relationship to a single Role carried out by multiple employees or a single Role carried out by a single employee. As such, the comparisons are equally applicable to groups of employees.

Additionally, any of the above relationships may be compared among employees subjected to the event occurrence, such as all employees receiving training for a particular skill, and among those employees not subject to the event occurrence or training (step 308). By adding this layer of analysis, additional filtering is provided to help determine changes in skill levels and performance metrics in light of both known and unknown influences. For example, if a trained group of employees showed a thirty-five percent (35%) increase in a common performance metric while an untrained group showed a fifteen percent (15%) increase in a common performance metric over the same period of time, there is a strong indication that the training provided a twenty percent (20%) increase in job performance, and that other influences contributed to a fifteen percent (15%) increase in job performance. Next, the results of such relationship analyses may lead to the study or identification of influences beyond the event occurrence, or training, that affect the relationships, and in particular, affect performance metrics leading to the fulfillment of objectives, goals, or strategies (step 310). Any of these relationships may be combined with one or more of the other relationships to help assess the relationships among skill levels, performance metrics, known events, and unknown influences.

Figure 4:
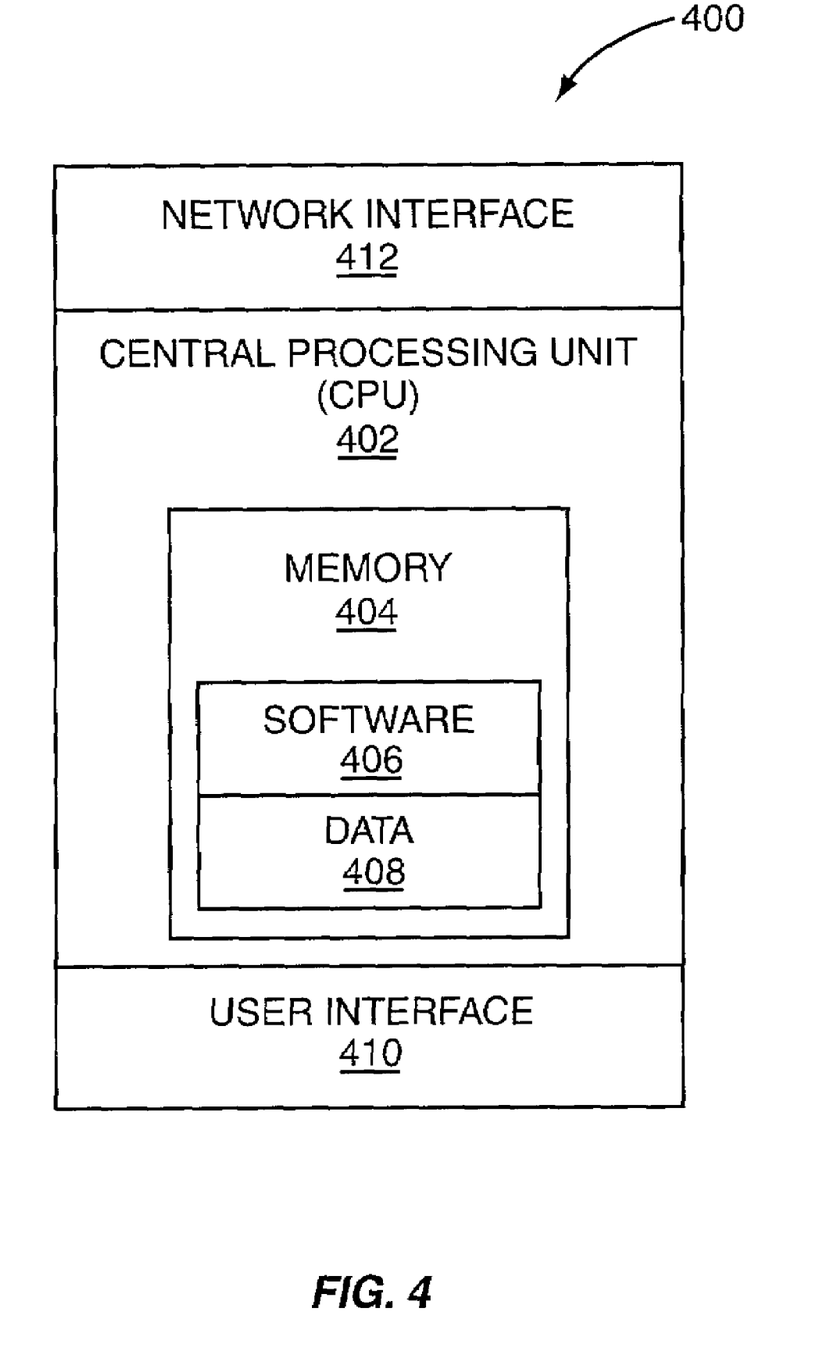
FIG. 4 is a block representation of a general purpose computer configured with the necessary software to carry out the concepts of the present invention.

The concepts of the present invention are preferably incorporated in software capable of instructing a general purpose computer to function accordingly. Further, much of the processing may take place in real time and without human assistance. Such a general purpose computer is depicted in FIG. 4. The general-purpose computer, generally referenced as 400, will typically include a central processing unit (CPU) 402 associated with memory 404 containing the requisite software 406 and data 408 for carrying out the present invention. The computer 400 will typically include a user interface 410, which may include a keyboard, mouse, display, microphone(s), speaker(s), and any number of drives to accept computer readable media. The concepts of the present invention may be implemented in software carried on the computer readable media, which may include electromagnetic and optical storage media. The storage media may include floppy disks, compact disks (CDs), digital versatile disks (DVDs), and the like. A network interface 42 is provided for traditional networking among other workstations, servers, and the like. The following outlines three examples highlighting exemplary implementations of the concepts of the present invention.

As noted, each Role has associated skills and each associated skill has a skill level corresponding to skill proficiencies that are rated and defined by the company. In the first scenario, the organization is a fictional automobile manufacturing plant. One of the Roles in the plant is Door Welder; one of the associated skills is Welding. The automobile plant has defined the skill level as the number of welds performed in an hour. However, the plant does not track the number of welds that occur on the line. The plant measures a Door Welder's output in terms of the number of doors completed in a day. This measurement is the performance metric for the Role of a Door Welder.

As noted, performance metrics are used to associate defined skills with job performance requirements of Roles defined by the organization. The performance metric, therefore, can serve as a direct link between an employee in a Role and the goals and objectives of a company. A performance metric can be viewed as the measure of how an employee is doing his or her job and can be used as a tool for determining a corresponding return on investment (ROI).

Continuing with the example, assume Robert Gibson (Employee) is assigned the Role of a Door Welder. Three of his associated skills are shown in the table below. Note that each skill level is rated on a six-point scale (0 to 5).

| Associated Skill | Skill Definition | Skill Level |
| --- | --- | --- |
| Welding | welds per hour | 2 |
| Assembly Line Speed | unit lag time | 3 |
| HIV Prevention | video seen or not seen | 1 |

Although these three associated skills are required for the Door Welder Role, only the first two are Role specific; the third, HIV Prevention, is required of all company employees. Robert's most recent performance evaluation showed that he was able to complete eight doors per day, which is the performance metric. His welding skill is measured by welds per hour, and he was able to complete 20 welds per hour. A skill level for welding relates ten welds per hour to one skill level point. As such his skill level is two. Recently, management has decided that the skill level required for the Welder Role should increase from Level 2 to Level 3. This change was then recorded, and the gap in skill level between the Role requirement and Robert's actual ability (skill level) triggered the need to train Robert in Spot Welding to increase his actual skill level by one point.

After Robert completed the Spot Welding training, his actual skill level increased to the required Level 3. Accordingly, his welds per hour rating increased to 30. However, Robert's subsequent Performance Evaluation showed that he still has a performance metric of only eight doors per day. Therefore, although Robert received Spot Welding training his meaningful job performance has not improved. From the above, the software implementing the concepts of the present invention could determine that:

1. the Spot Welding training event increased Robert's skill level;
2. there was no change in his performance metric for the number of doors-per-day; and
3. there was no real ROI from the training event.

A statistical analysis of this data could lead to several conclusions including:
1. door welding requires only a maximum skill level corresponding to Level 2;
2. improving the performance metric also may require an increase in Assembly Line Skill Level; and
3. improving the performance metric may require changes other than employee skill.

In the second scenario, a Role in an accounting firm is Executive Secretary and one of the associated skills is Typing. The accounting firm has defined the skill level for Typing to correspond to the number of words typed per minute; however, the firm does not track the number of words that an Executive Secretary types in the course of a day. Instead, the firm measures the Executive Secretary's output in terms of the number of invoices processed in a week, which corresponds to the performance metric affecting the accounting firms bottom line. Mark Spencer (Individual) is assigned to the Executive Secretary Role.

Mark's most recent performance evaluation showed that on average in a week, he completed 30 invoices (actual performance metric) and left 15 invoices unprocessed. His words per minute rating was 55, which corresponds to Skill Level 2. Since then, management has increased the Skill Level requirement for this Role from Level 2 to Level 3. This change triggered an alert that Mark needed training to increase his words per minute rating. A training event called Keys to Typing was selected to accomplish this task.

After Mark completed the training, his typing skills warranted a Skill Level 3. His next performance evaluation after training showed that he now completes 38 invoices each week (performance metric); and he types 65 words per minute, which corresponds to Skill Level 3. A statistical analysis of this data indicates that Mark's Typing Skill Level and job performance increased based on his actual performance metric.

Continuing with the second scenario: The accounting firm has 20 Executive Secretaries, and each Executive Secretary files approximately 30 invoices per week (performance metric) and types approximately 60 words per minute. Half of the 20 Executive Secretaries attend the Keys to Typing training. After completing the training, their Skill Levels increase to a number corresponding to an increase to 80 words per minute.

Subsequently, performance evaluations show that those Executive Secretaries who received the training now file 38 invoices per week on average, and those who did not receive the training now file 33 invoices per week on average. Using statistical analysis, a determination is made about how much of the change in performance can be attributed to the training. The analysis may show that:
1. the training resulted in an increase in output of five invoices per week; and
2. other, as yet unidentified, factors contributed to an increase in output of three invoices per week.

From this analysis, ROI for the training can by analyzed to determine whether the cost of training justifies the increase in performance associated with the training. Additional analysis can be provided to study the:
1. relationship between typing skill level and job performance;
2. minimum and maximum effect of training on skill level;
3. minimum and maximum effect of training on job performance;
4. non-training contributions to changes in job performance; and
5. relationship of training ROI to non-training ROI.

In the third scenario, DrugTek, a fictional global pharmaceutical company, is preparing to launch a new oncology treatment drug called OTD. The drug has not yet been approved for use in North or South America. DrugTek wants to maximize its sales in the first year of distribution, as their exclusive patent will expire in one year. DrugTek currently has five products in distribution—referred to herein as Product A, Product B, Product C, Product D, and Product E. The sales representatives have varying degrees of knowledge about these products. DrugTek has established a global sales force of 260 representatives, divided into six virtual regions:

| Region | Geographical Area | # Sales Reps | # Sales Reps Carrying each of the 5 Products |
|---|---|---|---|
| 1 | North America | 60 | 15 |
| 2 | South America | 40 | 10 |
| 3 | Europe | 60 | 15 |
| 4 | Africa | 30 | 8 |
| 5 | Western Asia | 30 | 10 |
| 6 | Pacific Rim and Australia | 40 | 10 |

In January 2001 DrugTek established a business objective to reach $10M in sales of OTD by the end of the second quarter in Regions 3, 4, and 6. Meeting this business objective involves five tasks:
1. define the Role of an OTD Sales Representative;
2. identify those who best fit this Role;
3. identify the gaps in the Sales Representatives' training;
4. identify the training that fills those gaps; and
5. deliver the training.

Each step may be comprised of multiple steps, with the software implementing at least certain of the concepts of the present invention on computer 400, or the like, automatically or prompting the user to do so.

Initially, the Role of an OTD Sales Representative is defined. As described previously, creating a Role preferably involves the steps of: creating a name for the Role; identifying a skill; and identifying a skill level (or proficiency) associated with the skill. As such, assume the administrator decides on a Role name of OTD Sales Staff. Each skill associated with this Role is the name of a Role found in a database under staff in a company Role/skill database. The Roles have a subset of skills and skill levels (proficiencies). The administrator can select and modify a Role from a template database or company Role/skill database, or the administrator can start from a blank Role template. For this scenario, a blank Role template is used. The Role template may take the on the following form:

Role Name: OTD Sales Staff
Skill: Region 3 OTD Sales Representative
Skill: Region 4 OTD Sales Representative
Skill: Region 6 OTD Sales Representative Ultimately, DrugTek will have 30 OTD Sales Representatives, with ten in each of these three regions.

Next, skills must be identified and associated with the Roles. Assuming the company Role/skill database contains most of the skills required, which are preferably selected from drop-down menus or search fields. The administrator may create a complete skill set for a Sales Representative. DrugTek has associated ten general sales skills with this Role as shown below:

Role: Region 4 OTD Sales Representative
Skill: Act!™2000 contact management software
Skill: Active Listening
Skill: Persuasion
Skill: Public Speaking
Skill: Reading Comprehension
Skill: Biology
Skill: Chemistry
Skill: DrugTek Corporate Sales Policy
Skill: Time Management
Skill: Pharmacology In addition, the administrator selects five Region-specific skills associated with Region 4:
Skill: African Political History
Skill: African Geography
Skill: DrugTek African Sales Objectives
Skill: Language—French
Skill: Region 4 Sales Experience The administrator then adds two more skills crucial to OTD Sales:
Skill: Basic Oncology
Skill: Oncology Industry History Because OTD is closely related to products A and C, the administrator adds two more skills.
Skill: Drug A Product Knowledge
Skill: Drug C Product Knowledge Finally, there is one new skill unique to this Role:
Skill: OTD Product Knowledge Identification of the Role now appears as:

Role: Region 4 OTD Sales Representative
Skill: Act!2000 contact management software
Skill: Active Listening
Skill: Persuasion
Skill: Public Speaking
Skill: Reading Comprehension
Skill: Biology
Skill: Chemistry
Skill: DrugTek Corporate Sales Policy
Skill: Time Management
Skill: Pharmacology
Skill: African Political History
Skill: African Geography
Skill: DrugTek African Sales Objectives
Skill: Language—French
Skill: Region 4 Sales Experience
Skill: Basic Oncology
Skill: Oncology Industry History
Skill: Drug A Product Knowledge
Skill: Drug C Product Knowledge
Skill: OTD Product Knowledge Next, skill levels must be identified for each skill associated with the Role. Each client may use its own system of establishing proficiency ratings to arrive at a skill level. For this example, a percentage-based conversion system is used to arrive at a six-point system (0 to 5) as follows:
0=no experience/exposure/proficiency
1=beginner: minimal exposure
2=familiarity: basic understanding
3=functional: moderate understanding
4=expert: superior understanding
5=master: complete understanding For each skill, the administrator will determine what each rating point represents. These definitions are preferably text fields associated with each skill. For example:

Skill: Language—French
0=no experience
1=beginner: limited vocabulary

2=familiarity: elementary ability to read (e.g., menus, store signs)
3=functional: able to converse, read a newspaper
4=expert: essentially bilingual with limited translator skills
5=master: able to serve as interpreter and translator The Role now appears as:

| Role: Region 4 OTD Sales Representative (Skill) | Skill Level (Minimum Proficiency) |
|---|---|
| Act!2000 contact software | 3 - functional |
| Active Listening | 3 - functional |
| Persuasion | 3 - functional |
| Public Speaking | 4 - expert |
| Reading Comprehension | 4 - expert |
| Biology | 2 - familiarity |
| Chemistry | 2 - familiarity |
| DrugTek Corporate Sales Policy | 4 - expert |
| Time Management | 3 - functional |
| Pharmacology | 2 - familiarity |
| African Political History | 2 - familiarity |
| African Geography | 2 - familiarity |
| DrugTek African Sales Objectives | 4 - expert |
| Lanuage - French | 3 - functional |
| Region 4 Sales Experience | 3 - functional |
| Basic Oncology | 3 - functional |
| Oncology Industry History | 3 - functional |
| Drug A Product Knowledge | 4 - expert |
| Drug C Product Knowledge | 3 - functional |
| OTD Product Knowledge | 4 - expert |

At this point the software will identify those employees who most closely match the Role that has been created. The administrator can establish any number of criteria to limit or expand the search. Below is a list of some of the criteria that may be used to help identify those who best fit the Role.

| Restrictions | Expansions |
|---|---|
| In-house Only/Out of House Only | Decrease Proficiency Requirement |
| Exact Match to Specific Skill(s) | Ignore Specific Skill(s) |
| Specific Department | Number of Returns |
| Seniority | |
| Formal Education/Degree | |
| Location | |
| Increase Proficiency Requirement | |

Assume the administrator has chosen the following search criteria:

In-house Only;

Region 4 Only;

Exact Match Skill: Drug A Product Knowledge or Skill: Drug C Product Knowledge;

Exact Match Skill: Language—French;

Exact Match Skill: Basic Oncology;

Return 10 Matches;

Ignore Skill: Act!2000; and

Ignore Skill: African Geography.

From this search criteria, the software could generate the ten "best fit" matches, in order of fit. Below is a table illustrating one example of these ten records:

| Mark Anthony Hadden (Skill) | Actual Skill Level |
|---|---|
| Act!2000 contact sofftware | 0 - no proficiency |
| Active Listening | 3 - functional |
| Persuasion | 3 - functional |
| Public Speaking | 4 - expert |
| Reading Comprehension | 4 - expert |
| Biology | 3 - functional |
| Chemistry | 2 - familiarity |
| DrugTek Corporate Sales Policy | 4 - expert |
| Time Management | 3 - functional |
| Pharmacology | 3 - functional |
| African Political History | 2 - familiarity |
| African Geography | 3 - functional |
| DrugTek African Sales Objectives | 4 - expert |
| Language - French | 3 - functional |
| Region 4 Sales Experience | 3 - functional |
| Basic Oncology | 3 - functional |
| Oncology Industry History | 3 - functional |
| Drug A Product Knowledge | 3 - functional |
| Drug C Product Knowledge | 3 - functional |
| OTD Product Knowledge | 0 - no proficiency |

After identifying the best matches, it is preferable to generate a report identifying the gaps between skill levels of the employees and the Role. An example report highlighting gaps is shown below:

| Mark Anthony Hadden (Skill) | Actual Skill Level | Skill Level For Role | Gap |
|---|---|---|---|
| Act!2000 contact software | 0 - no proficiency | 3 - functional | +3 |
| Active Listening | 3 - functional | 3 - functional | 0 |
| Persuasion | 3 - functional | 3 - functional | 0 |
| Public Speaking | 4 - expert | 4 - expert | 0 |
| Reading Comprehension | 4 - expert | 4 - expert | 0 |
| Biology | 3 - functional | 2 - familiarity | −1 |
| Chemistry | 2 - familiarity | 2 - familiarity | 0 |
| DrugTek Corporate Sales Policy | 4 - expert | 4 - expert | 0 |
| Time Management | 3 - functional | 3 - functional | 0 |
| Pharmacology | 3 - functional | 2 - familiarity | −1 |
| African Political History | 2 - familiarity | 2 - familiarity | 0 |
| African Geography | 3 - functional | 2 - familiarity | −1 |
| DrugTek African Sales Objectives | 4 - expert | 4 - expert | 0 |
| Language - French | 3 - functional | 3 - functional | 0 |
| Region 4 Sales Experience | 3 - functional | 3 - functional | 0 |
| Basic Oncology | 3 - functional | 3 - functional | 0 |
| Oncology Industry History | 3 - functional | 3 - functional | 0 |
| Drug A Product Knowledge | 3 - functional | 4 - expert | +1 |
| Drug C Product Knowledge | 3 - functional | 3 - functional | 0 |
| OTD Product Knowledge | 0 - no proficiency | 4 - expert | +4 |

As the above report illustrates, Mark has more than the required proficiency in three skill areas and less in three areas. Preferably, the software will identify that Mark needs additional training in:

Act!2000

Drug A Product Knowledge

OTD Product Knowledge

The software may identify the training that fills these gaps and then generate a list of all training events that would deliver to Mark the knowledge he needs to improve his proficiency in the three identified skills. Because such a list can be fairly large, the administrator may choose to set some additional criteria for selecting the training options. The software may allow the administrator to limit this search by several different criteria including but not limited to:

Minimum Starting Proficiency (prerequisite skills)
Schedule (duration, start date, end date, multiple course coordination)
Provider (in-house only vs. Vendor)
Industry (specific or across industries)
Format (CD-ROM, CBT, web-based, classroom, book, private tutor)
Rating (measures relationship between educational outcome and skill proficiency)
Price (maximum single event, maximum cumulative)
Location (by any virtual region or subregion criteria)
Single Event
Multiple Coordinated Events Assume the administrator chooses the following three criteria to limit the search for each training event:
Act!2000: Minimum Starting Proficiency—0
Act!2000: Format—CD-ROM, CBT, or web-based
Multiple Events: full training complete by date (three weeks from today)

Because DrugTek has not restricted the Act!2000 training to a specific vendor, the software may return several options fulfilling this criteria. To organize the multiple options, the administrator may sort the list by price and select the least expensive training package, as shown in the table below:

| Skill | Training Method | Training Type | Availability |
|---|---|---|---|
| Act!2000 | Vendor-provided CD-ROM tutorial | self-paced | Ships in 2–3 days |
| Drug A Product Knowledge | Videotape (four hours) | self-paced | Same-day shipping |
| OTD Product Knowledge | Interactive broadband telecast (2 days) | classroom | Client requests schedule |

The software may generate a training report indicating that Mark will be able to complete all three training events within the three-week window specified by the administrator and the time period allotted by the business objective. If no training schedule had met the business objective—whether by timeframe, pricing, or training availability—the software could report this information to the administrator including why no match could be made.

After Mark completes the three training events, he is ready to begin OTD Product Sales in Region 4. Evaluation of his sales data is scheduled for the end of each month for the second quarter (Q2), which enables DrugTek to:
evaluate the effectiveness of its training program;
monitor the pace of meeting second quarter objectives; and
decide whether and/or when to adjust the goals, objectives, training, or personnel associated with the business objective.

All of this data is saved, enabling DrugTek to reassess its business objectives as they evolve and to plan future training initiatives.

Assume for the Role of OTD Sales Representative, the administrator created a performance—defined as the number of sales revenues per day and measured as the daily average of the total sales in a month. This measurement allows for variation in both the length of months and the number of workdays associated with that month—noted in the algorithm below:

Total Sales Revenue in a Month÷Number Work Days in a Month

Mark is one of 30 OTD Sales Representatives assigned to target Regions 3, 4, and 6. His performance in any given month will be compared with the performance metrics of the other 29 OTD Sales Representatives to determine the:
ROI of training;
progress in attaining the second quarter sales goal; and
correlations among various skills, skill levels (proficiencies), and performance metrics.

In this scenario, DrugTek determines that each Sales Representative needs to attain $333,333 in total sales for the second quarter. Suppose Mark averages $3,000 per day in OTD sales during his first month. If he maintained this average through out the second quarter, he would accrue $198,000 in sales by the end of the quarter—significantly below the requisite quota that the administrator created ($333,333). The software may generate this data in a graphical report. The data in the graph generated for Mark's sales shows the following:

| Time Period | Sales |
|---|---|
| Days 1, 2 & 3 | 0 |
| Week 1 | $2,000 |
| Week 2 | $12,000 |
| Week 3 | $18,000 |
| Week 4 | $34,000 |

Although Mark's daily average was only $3,000, the data shows that he is increasing his sales rapidly with each successive week. In the fourth week Mark averaged $4,857 per day. If his performance level continues unchanged for the remainder of the second quarter, the software would preferably report that at the end of the second quarter Mark would accrue $279,708 in total sales.

Although the latter figure is still below the quota of $333,333, it is significantly higher than the $198,000 projected on the basis of the daily performance metric alone. Using the information generated in both the performance metric and the graph, management can make better-informed decisions regarding the outcome of the stated goal. Management can become still better informed if they examine the aggregate data for all OTD Sales Representatives. If the software is configured to generate reports for each Sales Representative, each Region, and all Regions, DrugTek can receive more accurate data analysis models.

In examining the data for the other nine Africa Region OTD Sales Representatives, the software may show that Mark's sales performance is closely in line with his regional peers. The total sales from Sales Representatives in Pacific Rim and Australia Region are approximately ten percent (10%) lower than the total sales from Sales Representatives in Africa Region. But in Europe the Sales Representatives sales are thirty percent (30%) higher than the sales totals in Africa Region. Preferably the software is configured to generated the following report:

| Type of Sales Totals | Africa Region $ | Pacific Rim and Australia Region $ | Europe Region $ | Global Totals $ |
|---|---|---|---|---|
| Daily Sales Average (DSA) per Representative | 3,000 | 2,700 | 3,900 | |

-continued

| Type of Sales Totals | Africa Region $ | Pacific Rim and Australia Region $ | Europe Region $ | Global Totals $ |
|---|---|---|---|---|
| Monthly Total per Representative | 66,000 | 59,400 | 85,800 | |
| Projected Total per Representative | 198,000 | 178,200 | 257,400 | |
| DSA per Region | 30,000 | 27,000 | 39,000 | |
| Monthly Total per Region | 660,000 | 594,000 | 858,000 | |
| Projected Total per Region (unmodified) | 1,980,000 | 1,782,000 | 2,574,000 | 6,336,000 |
| Most Recent Week DSA per Representative | $4,857 | 4,371 | 6,314 | |
| Weighted Projected Total per Representative | 279,708 | 251,724 | 363,616 | |
| Weighted Projected Total per Region | 2,797,080 | 2,517,240 | 3,636,160 | 8,950,480 |

These two projected totals (unmodified and weighted for most recent performance) differ by $2,614,480. The second projection takes into account the improvement that has occurred in the first month of the second quarter and bases future earnings on most recent performance. Because these figures indicate that DrugTek may still fall short of the goal by $1,049,520, DrugTek may need to consider whether it can:

1. assume that improvement will continue at the present rate;
2. assume that future sales will be similar to current sales; and
3. make any assumptions regarding future sales.

Although the software should not make these types of decisions for DrugTek, the software can be configured to provide accurate aggregate data that can help DrugTek make better-informed decisions. Listed below are some of the possible responses from the software to the three considerations mentioned above:

1. if DrugTek assumes that sales will remain at their current rate, then the software could report that six more days of sales are needed to achieve the goal of $10M in OTD Sales;
2. if DrugTek assumes that sales will continue to improve at the same rate, then the software could report that the goal would be achieved ten days earlier than required; and
3. even if DrugTek makes no assumptions regarding future sales, the software could analyze the second month of performance metrics and generate additional data—enabling DrugTek to further refine the model and its projections.

At the end of the second quarter, assume DrugTek requests reports on the data. In addition to the direct sales figures, the software may generate aggregate correlation reports about the training that individual OTD Sales Representatives received. The software could be configured to report the following:

Five of the 30 OTD Sales Representatives did not have the required proficiency in Act!2000. However, their schedules did not allow them the time needed to receive that training. Therefore, management gave them permission to continue selling despite these factors. Four of the five OTD Sales Representatives did not significantly differ in sales from their regional peers. Interviews with these four individuals revealed that each uses different contact management software. The fifth does not use contact management software. His sales were statistically lower than his regional peers. Conclusion: Attaining proficiency in Act!2000 is not a skill necessary for this Role, but Contact Management Software is a necessary skill. Therefore, DrugTek does not need to provide training on Act!2000 to those Sales Representatives who currently use a different software.

For the 10 OTD Sales Representatives operating in Africa Region, all spoke English; and eight spoke French at or above the required proficiency level. Sales were statistically lower for the two who were below the Level 3 Proficiency rating for French but were not significantly higher for those who had proficiency beyond the required Level 3. Conclusion: French Level 3 is a necessary skill for this Role but proficiency beyond Level 3 does not result in greater sales. DrugTek would realize increased revenues if more funds were allotted for training OTD Sales Representatives in French for this Role.

Of the 30 OTD Sales Representatives, ten had only Product A Sales Knowledge, 10 had only Product C Sales Knowledge, and ten had both Product A Knowledge and Product C Knowledge. Total sales for those with Product A Sales Knowledge were significantly higher than total sales for those without. There was no significant difference in total sales for those Sales Representatives with only Product A Knowledge compared to those with knowledge of both. Conclusion: Product A Knowledge is a necessary skill for this Role, and Product C Knowledge is not a necessary skill for this Role.

When searching for qualified candidates for the Role of OTD Sales Representative, DrugTek found only five candidates with Level 4 Public Speaking Proficiency. Sales for these five candidates were significantly higher than those with Level 3 Proficiency. Sales for those with Level 3 Proficiency were significantly higher than those with Level 2 Proficiency. There were no candidates with Level 1 or 0 Proficiency. Conclusion: Each increase in the level of Public Speaking Skill Proficiency resulted in an increase in sales. Therefore, Skill Proficiency is a necessary skill for this Role. DrugTek would realize increased revenues if more funds were allotted for training OTD Sales Representatives in Public Speaking.

For these examples, simple data in only one performance metric was used. Using multiple performance metrics, the software may track this data across many Roles with many more skills. The calculated return on investment can then statistically be linked to:

1. personal improvement (increase in skill);
2. job improvement (increase in task performance);
3. production improvement (increase in output); and
4. business improvement (increase in bottom line).

Although management must still determine how acceptable returns are defined, the software can provide the data that enables management to make that determination more accurate and more objective within a shorter timeframe.

The software may also be configured to identify non-training performance effects. Sales in Europe Region were significantly higher than sales in Africa Region or Pacific Rim and Australia Region, although there were no differences in training across these regions. The software may also identify the disparate economic conditions in the Africa Region and the Pacific Rim and Australia Region as a performance restriction. DrugTek could consider addressing these non-training performance effects (NTPE) by advertising more in Africa Region and less in the Europe Region, or DrugTek could consider these conditions when building strategies for future business goals. When a performance restriction is known in advance, the software preferably allows the user to identify it. The performance data will then be labeled with known or suspected performance restrictions and other NTPE factors such as environmental issues.

The software may be configured to provide additional information that would help clients make other types of decisions—including business goals, training programs, personnel deployment, deployment timelines, and market targets. Over time, the software may enable clients to see both the direct and indirect effects of training and other events and efficiently link training to business outcomes. Clearly, the present invention is capable of providing numerous benefits in a variety of forms.

The concepts of the present invention may be implemented as a method and in hardware and software. The software may be embodied in various types of computer readable media, including magnetic and optical mediums. Those skilled in the art will recognize improvements and modifications to the preferred embodiments of the present invention. All such improvements and modifications are considered within the scope of the concepts disclosed herein and the claims that follow.

What is claimed is:

1. A method comprising steps performed by a computer including
    defining a role having a measurable performance and a separately measurable skill, in which an improvement of the skill at least plausibly improves the performance;
    associating an individual with the role;
    before the occurrence of an event that may increase a skill level of the individual, measuring the individual's skill to determine a skill level and measuring the individual's performance as a first actual performance metric;
    after the occurrence of an event, assessing the individual's performance as a second actual performance metric;
    analyzing a relationship between the first and second actual performance metrics and the skill of the individual before and after the event occurrence on a computer; and
    determining whether the event occurrence increased the performance of the individual based at least partially on the relationship between the first and second actual performance metrics and the skill of the individual.

2. The method of claim 1 further comprising:
    analyzing a difference between a required skill level for the role and the measured skill level of the individual; and
    determining if training is necessary to raise the skill level to the required skifl level.

3. The method of claim 1 further comprising:
    comparing the measured skill levels of the individual before and after the event occurrence; and
    correlating any difference between the measured skill levels of the individual before and after the event occurrence with the ability of the individual to carry out the defined performance.

4. The method of claim 1 further comprising:
    comparing the measured skill level of the individual before and after the event occurrence with the firsL and second actual performance metrics; and
    determining a result of changes in the measured skill level of the individual before and after the event occurrence on the ability of the individual to carry out the defined performance.

* * * * *